(No Model.)
F. J. RABBETH.
COFFEE POT.
No. 506,338. Patented Oct. 10, 1893.
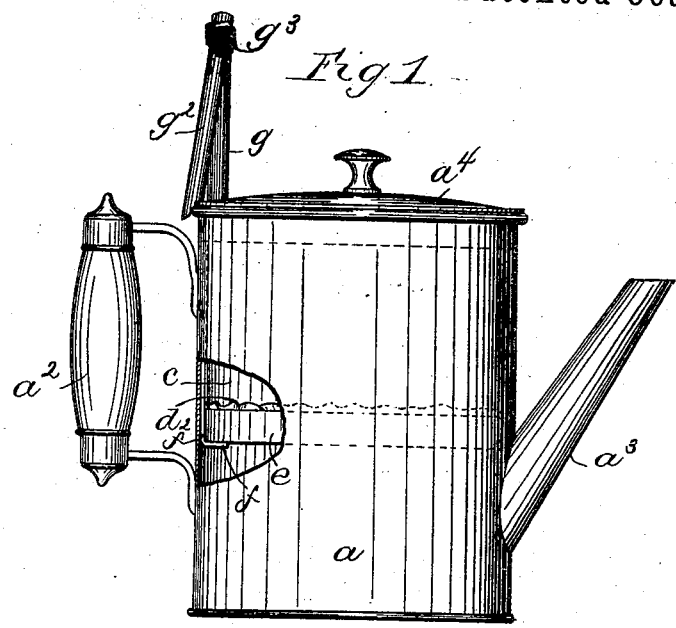
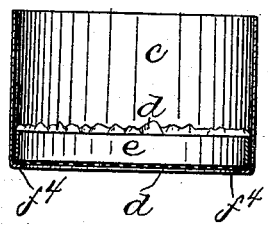
Fig. 5.
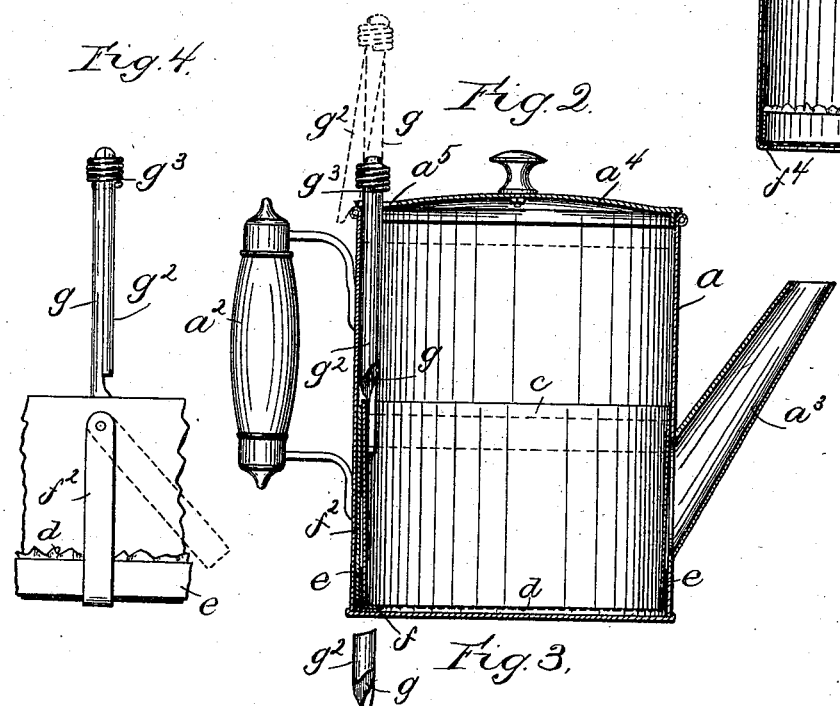
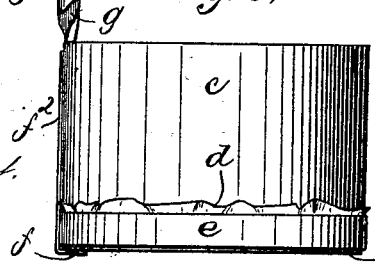
Fig. 3.
Witnesses
Jas. J. Maloney
M. E. Hill
Inventor
Francis J. Rabbeth
by Jos. P. Livermore
Atty

UNITED STATES PATENT OFFICE.

FRANCIS J. RABBETH, OF BOSTON, MASSACHUSETTS.

COFFEE-POT.

SPECIFICATION forming part of Letters Patent No. 506,338, dated October 10, 1893.

Application filed December 28, 1892. Serial No. 456,536. (No model.)

*To all whom it may concern:*

Be it known that I, FRANCIS J. RABBETH, of Boston, county of Suffolk, State of Massachusetts, have invented an Improvement in Coffee-Pots, of which the following description, in connection with the accompanying drawings, is a specification, like letters on the drawings representing like parts.

This invention relates to a coffee pot or analogous apparatus for making perfect infusions without boiling and also for filtering and clearing the liquid extracts.

The apparatus comprises a pot or receptacle of substantially cylindrical shape or of uniform sectional shape preferably for its entire height, and an internal chamber or receptacle vertically movable in the pot or main receptacle the said internal chamber being open at top and bottom and adapted to receive at its bottom a strainer which may be a piece of cloth or analogous material detachably clamped to the lower end of the internal receptacle so that when applied thereto it constitutes a pervious or foraminous bottom for said receptacle. This internal receptacle with the strainer applied thereto contains the ground coffee or material from which the infusion is to be made, and is at first placed in the lower part of the pot, or main receptacle, so that the liquid will be thoroughly mingled with the material from which the extract is to be made. The said internal receptacle is provided at its periphery with a handle or operating stem extending up through the main receptacle and projecting above the top thereof, passing through a notch or recess in the usual cover of the main receptacle and said handle is provided with means for engaging with the body of the main receptacle so as to support the inner receptacle at some distance above the bottom of the main receptacle, and independent of the cover thereof, in which position the liquid will percolate down through the strainer at the bottom of the inner receptacle and the material thereon, and will accumulate as a clear filtered extract or infusion in the lower part of the main receptacle, which may be provided with the usual spout through which the said liquid may be poured out.

Figure 1 is a side elevation of a coffee pot embodying this invention with the parts in the position occupied after the infusion is made, while it is being filtered into the lower part of the main receptacle, portions of the side wall of which are broken away to show the inner receptacle. Fig. 2 is a longitudinal vertical section showing the inner receptacle in full lines in its lowermost position and in dotted lines in lifted position. Fig. 3 is a side elevation of the inner receptacle; Fig. 4, a detail showing a portion of the inner receptacle and its operating handle in elevation on a plane at right angles to that shown in the other figures, and Fig. 5 a sectional view showing a modified construction of the inner receptacle and means for securing the removable strainer bottom thereto.

The receptacle $a$ constituting the main body of the apparatus is cylindrical in shape, that is, of substantially uniform sectional shape throughout its height. It may be provided with a suitable handle as shown at $a^2$, and a spout or outlet tube $a^3$ communicating with the lower portion of said receptacle. Within the main receptacle $a$ is contained a movable receptacle $c$ consisting of a metallic cylinder open at top and bottom and having a working fit in the main receptacle $a$ said inner receptacle having a detachable bottom $d$ which may be a piece of cloth or cloth-like material somewhat larger than the end of the receptacle $c$ and detachably secured thereto by having its edges turned up between the wall of the receptacle and a clamping ring $e$ which as shown in Figs. 1 to 4, is placed at the outside of said receptacle $c$ and as shown in Fig. 5, is placed at the inside of said receptacle $c$. In either case, the cloth is held stretched tightly over the lower end of the cylinder $c$ and forms a strainer bottom therefor capable of supporting the ground coffee or material from which the infusion is to be made while permitting the liquid to percolate through the said material and be filtered through said strainer bottom at the proper time.

In order to prevent possibility of the cloth and clamping ring being pulled off from the cylinder by the weight of the material upon it, the receptacle $c$ is provided with a lateral projection extending beneath the ring $e$. This holding projection when the ring $e$ is used at the outside of the receptacle may be a finger $f$ at the end of an arm $f^2$ connected with the receptacle $c$ and movable with relation thereto, for the purpose of disengaging the said ring when it is desired to remove it and the cloth from the receptacle.

As shown in Fig. 4, the arm $f^2$ is pivotally connected with the receptacle and can be sprung back and turned aside when it is desired to remove and replace the ring after which it will be turned into engagement with the ring as best shown in Figs. 1 and 3.

When the ring is used at the inside of the receptacle as shown in Fig. 5, the ring supporting projection $f^4$ may extend inward from the lower edge of the receptacle, and may if desired be in the form of a continuous lip or flange extending wholly around the same, the cloth and ring being introduced from the upper end of the receptacle.

When the ring is used at the outside of the receptacle the wall of the latter should taper slightly toward the lower end to afford room for the ring to move easily up and down in the main receptacle, and also to cause the ring to grip the cloth with a slight wedging action.

When the infusion is to be made the inner receptacle $c$ having its strainer bottom attached is placed at the bottom of the main receptacle $a$ as shown in full lines Fig. 2, and the ground coffee or other material from which the infusion is to be made is placed upon it, and the hot water or other liquid with which the extract is to be made, is poured into the top of the receptacle and the cover $a^4$ applied after which the liquid may be permitted to stand as long as required in order to extract the full strength from the material in the receptacle. In order to filter and collect the infusion or extract so that it may be drawn off for use the inner receptacle $c$ is raised above the bottom of the main receptacle $a$ as shown in Fig. 1, and in dotted lines Fig. 2, thus permitting the liquid to percolate down through the material and filter through the strainer bottom of the inner receptacle so as to collect as a clear liquid in the lower part of the main receptacle from which it may be poured through the spout $a^3$.

In order to raise the inner receptacle and support it during the straining or collecting operation it is provided with an operating handle shown in this instance as a rod or stem $g$ connected with the periphery of the inner receptacle $c$ and extending upward along the wall of the outer receptacle $a$ and through a suitable notch or recess $a^5$ in the cover $a^4$ so that the operator by pulling up on the said handle can raise the inner receptacle. The said operating rod or handle is provided with a catch or support shown in this instance as a bar $g^2$ pivotally connected with the upper end of the rod $g$ by a wire $g^3$ which passes through the parts $g$, $g^2$, and is wound loosely around the same so as to form a knob or operating handle therefor, and also limits the amount of pivotal movement of the bar $g^2$. When the receptacle is in its lowest position as shown in full lines Fig. 2, the bar $g^2$ lies in coincidence with the rod $g$, but when the inner receptacle is raised as shown in Fig. 1, the bar $g^2$ has its lower end thrown outward so as to engage with the upper edge of the main receptacle and thus constitute a prop or support for the rod $g$ and inner receptacle connected therewith.

By having the handle $g$ connected with the periphery of the inner receptacle $c$ and engaged with the body of the outer receptacle $a$ instead of with the cover thereof it is possible at any time to remove the cover $a^4$ of the main receptacle without disturbing the inner receptacle and a very simple, efficient, and inexpensive construction is attained. Thus it is possible at any time to lift off the cover and observe the condition of the materials being operated upon, which is very important and cannot be attained in apparatus of this kind in which the inner receptacle is supported from the cover of the main receptacle while the percolating and straining operation is going on. After the infusion is made the inner receptacle may be withdrawn from the outer receptacle and will remove all the solid material; and the strainer bottom can be quickly removed and the apparatus easily and thoroughly cleaned.

Fresh strainers may be readily used for each operation, as their cost is but trifling, and they can be quickly and easily applied.

I claim—

The combination of the cylindrical main receptacle $a$ and a removable cover therefor provided with a notch $a^5$, in its periphery with an internal receptacle consisting of a cylindrical side wall having a working fit and vertically movable in the main receptacle and provided with a strainer bottom, and a lifting handle for said inner receptacle connected with and extending upward from the said side wall thereof, said handle passing through the said notch in the cover and being provided with means for engaging the body of the main receptacle for the purpose of supporting the inner receptacle in elevated position therein, substantially as described.

In testimony whereof I have signed my name to this specification in the presence of two subscribing witnesses.

FRANCIS J. RABBETH.

Witnesses:
 JOS. P. LIVERMORE,
 JAS. J. MALONEY.